Figure 4:
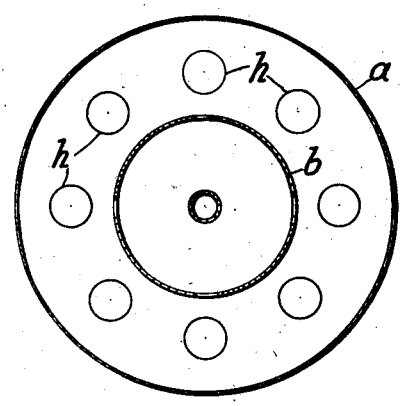

March 24, 1931.  F. LUTHER  1,797,831
ROTARY KILN COOLER
Filed Oct. 28, 1926  2 Sheets-Sheet 1
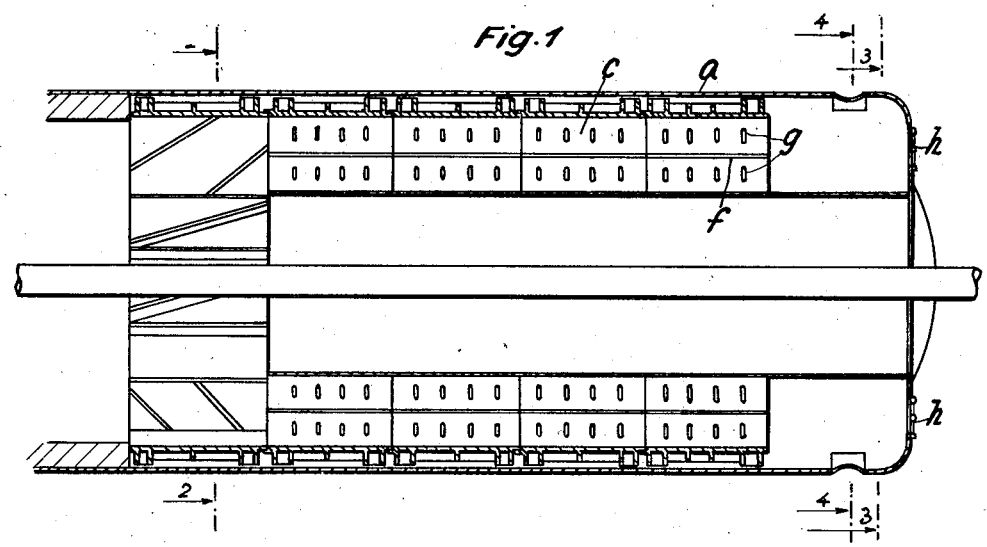
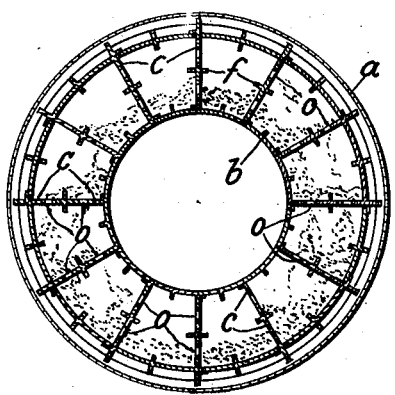
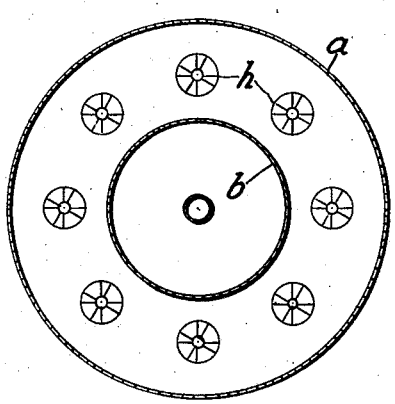

March 24, 1931. F. LUTHER 1,797,831
ROTARY KILN COOLER
Filed Oct. 28, 1926 2 Sheets-Sheet 2

Patented Mar. 24, 1931

1,797,831

UNITED STATES PATENT OFFICE

FRITZ LUTHER, OF DESSAU, GERMANY, ASSIGNOR TO THE FIRM G. POLYSIUS, OF DESSAU, GERMANY, A PARTNERSHIP

ROTARY-KILN COOLER

Application filed October 28, 1926. Serial No. 144,796.

In contra-distinction to former apparatus of this kind, especially coolers for rotary kilns which serve for the treatment of aluminous cement, wherein the material after being cooled down from a condition of white heat to red heat or when still in condition of white heat had been introduced into a separate drum positioned below the roasting drum, it has been proposed to construct the cooling drum as an attachment of the roasting drum. In a device of this kind final cooling is effected within the unitary drum around a stationary fuel-nozzle and the cooling drum is not provided with any chambers which could reduce the effective cross-section of said drum.

I have discovered that the aforementioned principle of cooling the material within a cooling drum which is constructed as an attachment of the roasting drum may be still further improved by subdividing the current of material into a number of individual currents. Such individual currents of burnt clinkers can be more easily cooled due to the fact that the material comes into more intimate contact with the cooling air supplied to the cooling drum. Practically this may be accomplished by providing within the cooling drum a number of radially directed distributing blades, metal sheets or the like which serve for subdividing the current of clinker which flows from the roasting drum towards the cooling drum in a number of individual currents.

According to my invention a further improvement consists therein that these radially directed distributing blades which connect the hollow cylinder with the wall of the kiln or with the wall of the cooling drum are further equipped with additional small transverse blades or the like which act as spreading blades. These spreading blades may be arranged in any desired angle and any desired number of such spreading blades may be used upon the main or distributing blades. Furthermore, in order to increase the effect of subdividing and distributing the material, said main blades, and eventually also said spreading blades, may be provided with openings $o$, slots or the like which will cause a dribbling or spreading movement of the material during the process of cooling.

In this manner the entire cross-sectional area of the kiln will be filled up with the material to be cooled, for instance, with cement-clinkers and a larger and essentially more intimate contact surface will thus be obtained between the cooling air and said material. This is a great advantage for the entire operation of the kiln. More particularly, according to my invention the material will be more effectively cooled and simultaneously therewith the cooling air will be conveniently and effectively preheated to act as combustion air. In addition to this, a considerable saving of fuel will be obtained.

In the accompanying drawing I have represented a preferred form of rotary kiln cooler constructed according to my invention.

Figure 5:
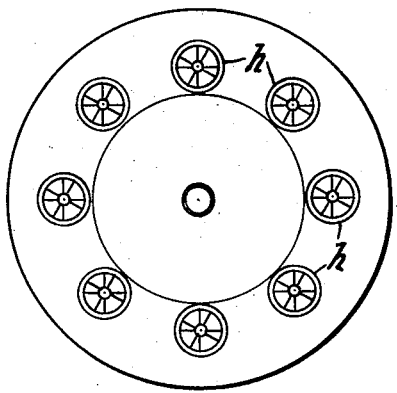
Figure 6:
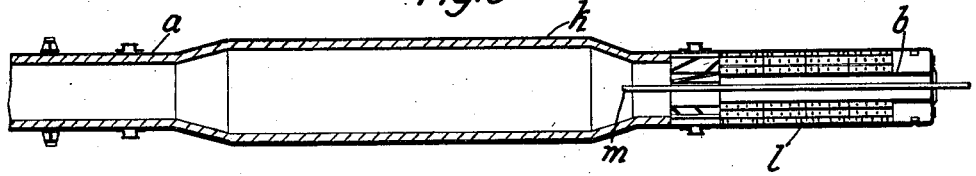

Fig. 1 is a longitudinal section through the new rotary kiln cooler, Fig. 2 a transverse section along line 2—2 of Fig. 1, Fig. 3 a similar section along line 3—3 of Fig. 1, Fig. 4, a similar section along line 4—4 of Fig. 1, Fig. 5 an end view of the kiln and more particularly of the end of the cooling drum thereof together with the regulating members serving for the admission of the combustion and cooling air, and Fig. 6 a longitudinal section through a complete kiln and cooler constructed according to my invention.

The rotary kiln $a$ is formed by an integral chamber in which the material is burnt or roasted, thereupon subjected to a preliminary cooling and subsequently to final cooling the roasted material. According to my invention the hollow cylinder $b$ is arranged within the cooling drum $l$ which as above mentioned is constructed as an attachment of the roasting drum, said hollow cylinder being connected to the walls of the kiln by means of radially arranged blades, metal sheets $c$ or the like. These radial blades or metal sheets $c$ carry at their central part spreading blades $f$ which effectively prevent sliding or shifting of the material along the surface of said radial blades. By the provision of said spreading blades $f$ the material to be cooled will be effectively spread apart. Besides the spreading blades $f$ spreading slots $g$ may be provided as indicated in Fig. 1. In accordance with special conditions of operation only the spreading blades $f$ or the spreading slots $g$ may be employed or both. The effect of spreading exerted upon the material by the blades $f$ or by the slots $g$ is more clearly illustrated in Fig. 2.

The rotary kiln $a$ consists, as shown, of a unitary tube into which the raw cement to be treated is introduced. The cement after being introduced into the kiln $a$ is first roasted therein, thereupon sintered in the enlarged sintering zone $k$ and thereupon cooled in the cooler $l$. Fuel is introduced through the nozzle $m$ from the right hand side of the kiln as indicated in Fig. 6. According to my invention a hollow cylinder $b$ is mounted within the cooler $l$, said hollow cylinder being connected with the wall of the kiln by means of radially arranged partitions in the form of walls, blades or the like which subdivide the kiln into several cells or compartments. These radial partitions or main blades $c$ together with the small spreading blades $f$ will exert in addition to the aforementioned sliding or shifting of the material along the surface of said radial blades $c$ a stray action upon said material and therewith bring about the aforementioned intimate contact between the roasted material in the kiln and the cooling air.

An important advantage of my invention consists therein that the material which is passed through the kiln is subdivided into a number of individual currents in order to effect very rapid cooling. The hollow cylinder $b$ which is arranged within the cooling drum $l$ is closed up at its outer end by means of a wall $n$ and the cooling drum $l$ is provided with regulating members $h$ which serve for properly supplying the combustion and cooling air. It is also possible to employ for two or more adjacent compartments of the kiln one common regulating member. In this manner it is possible by opening or closing said regulating members to exactly regulate the supply of cooling air to said several compartments.

I claim:

In apparatus for treating cement, an inclined rotary kiln closed at its lower end and comprising a cooling drum arranged concentrically within said kiln adjacent the lower end thereof, a hollow cylinder arranged within said cooling drum and connected to said drum by a plurality of radially arranged distributing partitions, spreading blades arranged transversely on said distributing partitions, openings in said partitions to permit material to flow therethrough, and openings in the kiln wall adjacent the lower end thereof for the discharge of material after being treated in said apparatus.

In testimony whereof I affix my signature.

FRITZ LUTHER.